United States Patent
Ba et al.

(10) Patent No.: US 11,250,635 B1
(45) Date of Patent: Feb. 15, 2022

(54) AUTOMATED PROVISIONING OF THREE-DIMENSIONAL (3D) PRINTABLE IMAGES

(71) Applicant: International Business Machines Corporation, Armonk, NY (US)

(72) Inventors: Amadou Ba, Navan (IE); Joern Ploennigs, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/114,573

(22) Filed: Dec. 8, 2020

(51) Int. Cl.
*G06T 19/00* (2011.01)
*G06T 7/73* (2017.01)
*G06T 19/20* (2011.01)

(52) U.S. Cl.
CPC .............. *G06T 19/006* (2013.01); *G06T 7/75* (2017.01); *G06T 19/20* (2013.01)

(58) Field of Classification Search
CPC ..................................................... G06T 19/006
See application file for complete search history.

(56) References Cited

U.S. PATENT DOCUMENTS

| | | |
|---|---|---|
| 9,836,883 B2 | 12/2017 | Tran |
| 10,275,909 B2 | 4/2019 | Pri-Tal |
| 10,540,776 B2 | 1/2020 | Tran |
| 2015/0042678 A1 | 2/2015 | Thomas |
| 2016/0054726 A1 | 2/2016 | Yoo |
| 2017/0010584 A1 | 1/2017 | Kim |
| 2017/0148222 A1 | 5/2017 | Holzer |
| 2019/0056715 A1 | 2/2019 | Subramaniyan |
| 2020/0364928 A1* | 11/2020 | Yu .......................... G06T 7/0002 |

FOREIGN PATENT DOCUMENTS

| | | |
|---|---|---|
| KR | 101651777 B1 | 8/2016 |
| WO | 2012029548 A1 | 3/2012 |
| WO | 2015027226 A1 | 2/2015 |
| WO | 2019169594 A1 | 9/2019 |
| WO | 2020112078 A1 | 6/2020 |

OTHER PUBLICATIONS

Ammar Malik, Hugo Lhachemi, Joern Ploennigs, Amadou Ba, Robert Shorten, An Application of 3D Model Reconstruction and Augmented Reality for Real-Time Monitoring of Additive Manufacturing, Procedia CIRP, vol. 81, 2019, pp. 346-351, (Year: 2019).*

(Continued)

*Primary Examiner* — Shivang I Patel
(74) *Attorney, Agent, or Firm* — William H. Hartwell (57) ABSTRACT

Methods, computer program products, and/or systems are provided that perform the following operations: obtaining image data, wherein the image data includes a plurality of images; generating visualizations for one or more of the plurality of images included in the image data; obtaining a selection of one of the plurality of images for which a visualization was generated; generating three-dimensional (3D) model data based on the selected one of the plurality of images; and providing the 3D model data of the selected one of the plurality of images for generation of a 3D printable object.

20 Claims, 7 Drawing Sheets

(56) References Cited

OTHER PUBLICATIONS

Butt, Javaid, "Exploring the Interrelationship between Additive Manufacturing and Industry 4.0", Designs 2020, 4, 13, Published Jun. 17, 2020, 33 pages, doi:10.3390/designs4020013.
Lhachemi et al., "Augmented Reality, Cyber-Physical Systems, and Feedback Control for Additive Manufacturing: A Review", in IEEE Access, vol. 7, 2019, pp. 50119-50135, date of current version Apr. 25, 2019, Digital Object Identifier 10.1109/ACCESS.2019.2907287.
Li et al., "Image-Based 3D Shape Generation Used for 3D Printing", AsiaSim 2018, Communications in Computer and Information Science (CCIS), vol. 946, pp. 539-551, <https://doi.org/10.1007/978-981-13-2853-4_42>.
Malik et al., "I-nteract: A Cyber-Physical System for Real-Time Interaction With Physical and Virtual Objects Using Mixed Reality Technologies for Additive Manufacturing," IEEE Access, vol. 8,2020, pp. 98761-98774, Digital Object Identifier 10.1109/ACCESS.2020.2997533.
Malik et al., "An Application of 3D Model Reconstruction and Augmented Reality for Real-Time Monitoring of Additive Manufacturing", Procedia CIRP 81 (2019), 52nd CIRP Conference on Manufacturing Systems, pp. 346-351.
Schwab, Burkhard, "Why generative design will change the way we make products", Mar. 6, 2020 [Accessed Jul. 19, 2020], 4 pages, <https://uxdesign.cc/generative-design-additive-manufacturing-and-eaas-will-change-the-way-we-make-products-dfba55046386>.
Wu et al., "Learning a Probabilistic Latent Space of Object Shapes via 3D Generative-Adversarial Modeling", 29th Conference on Neural Information Processing Systems (NIPS 2016), Barcelona, Spain, arXiv:1610.07584v2 [cs.CV] Jan. 4, 2017, 11 pages.

* cited by examiner

AUTOMATED PROVISIONING OF THREE-DIMENSIONAL (3D) PRINTABLE IMAGES

BACKGROUND

The present invention relates generally to the field of three-dimensional (3D) printing, and more particularly to providing for provisioning of 3D-printable images.

Generally, 3D printing is a process of joining materials to make a physical object from a 3D model. 3D printing operates layer by layer, for example, starting with a first base layer and adding a layer one at a time on top of the previous layer, until all N layers have been printed, producing the physical object.

Often, one bottleneck of 3D printing can be the complex process of creating 3D models from scratch. Typically, it can take hours to manually create, refine, and adjust digital models to arrive at their most optimized form. Computer-aided design (CAD) models, despite their effectiveness, can be costly which may also reduce the attractiveness of 3D printing.

SUMMARY

According to aspects of the present invention, there is a method provided that performs the following operations (not necessarily in the following order): obtaining image data, including a plurality of images; generating visualizations for one or more of the plurality of images included in the image data; obtaining a selection of one of the plurality of images for which a visualization was generated; generating three-dimensional (3D) model data based on the selected one of the plurality of images; and providing the 3D model data of the selected one of the plurality of images for generation of a 3D printable object. Additional embodiments of the present disclosure provide for a computer program product and/or a system that include program instructions programmed to perform the operations of the method.

In some embodiments, the method, computer program product, and/or a system can further include operations of determining one or more classes of images; generating one or more new images in each of the one or more classes using a machine learning framework, wherein the machine learning framework is trained to generate new images for the one or more classes of images; and providing the one or more new images as part of the image data. In some embodiments, the machine learning framework includes a generative adversarial network.

In some embodiments, the visualizations of each of the plurality of images are generated within a virtual environment based on mixed reality.

In some embodiments, the method, computer program product, and/or a system can further include operations of providing image visualization output to an augmented reality device as part of the generating of visualizations of each of the plurality of images within the virtual environment.

In some embodiments, the generating of 3D model data based on the selected one of the plurality of images comprises can further include operations of acquiring image data associated with the selected one of the plurality of images; generating 3D model surface encoding data based, at least in part, on the image data associated with the selected one of the plurality of images; and generating 3D model reconstruction data based, at least in part, on the image data associated with the selected one of the plurality of images.

In some embodiments, the 3D model data is stored using a 3D file format.

In some embodiments, the method, computer program product, and/or a system can further include operations of generating recommendations for optimal printing of the 3D printable object.

DETAILED DESCRIPTION

According to aspects of the present disclosure, systems and methods can provide for automated provisioning of three dimensional (3D) printable images. In particular, systems and methods of the present disclosure can provide for generating and/or recommending 3D printable images, for example, using artificial intelligence (AI) systems. The systems and methods of the present disclosure can provide for visualization of and/or interaction with the generated/recommended 3D printable images, for example, using mixed reality system(s)/environment(s) (e.g., combination of augmented reality and virtual reality, aspects of real environment(s) and virtual environment(s), etc.). The systems and methods of the present disclosure can provide for generating 3D models that can be used for 3D printing based on visualized/selected 3D printable images. In some embodiments, the systems and methods of the present disclosure can provide for translating generated/selected two dimensional (2D) images into 3D model(s) and using 3D printers to print objects based on the 3D models created from selected images. In some embodiments, the systems and methods of the present disclosure can provide for quickly prototyping 3D printable objects, for example, allowing for simulating and visualizing 3D models of 3D printable images.

In general, 3D printing is a process of joining material(s) to produce a physical object based on a 3D model. 3D printing creates the object layer by layer, for example, first starting with a base layer and adding each additional layer one at a time on top of the previous layer, until all N layers have been printed, producing the physical object.

Often, one bottleneck of 3D printing can be the complex process of creating 3D models from scratch. Typically, it can take hours to manually create, refine, and adjust digital models to arrive at the most optimized form for 3D printing. In some cases, computer-aided design (CAD) models, despite their effectiveness, can be costly which may also reduce the attractiveness of 3D printing.

Generally, 3D printing is an example of additive manufacturing where a process of joining materials can be used to produce an object, for example, based on a 3D model. An additive manufacturing (e.g., 3D printing) process can include determining materials, design, modelling, and simulations, for example, using 3D CAD models, standard triangle language (STL) file format. Additive manufacturing (e.g., 3D printing) can further include materials processing and layering, for example, slicing a 3D design (e.g., in STL format) into individual layers and translating a 3D model into language a 3D printer can understand (e.g., G-code control language, etc.). The 3D printer can then generate a 3D object as a final product. Additive manufacturing (e.g., 3D printing) can provide technology to build a wide range of products, including designing and building complex shapes, and produce products requiring little to no additional assembly. However, in general, typical additive manufacturing (e.g., 3D printing) can have drawbacks, including considerable effort for design, slow build rates, and high production costs (e.g., due to defects, etc.).

Accordingly, embodiments of the present disclosure can provide systems and methods that allow for use of machine learning frameworks (e.g., generative adversarial network (GAN) and/or the like) and mixed reality environments (e.g., augmented reality and virtual reality, etc.) to provide for generating, recommending, and/or visualizing images and generating 3D models based on selected images such that 3D printers can print objects based on the 3D models. Embodiments of the present disclosure can provide for automatic provisioning 3D printers with AI generated images (e.g., using GAN, etc.) and using mixed reality environment(s) to provide improved interactions between operators/designers and 3D printers.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
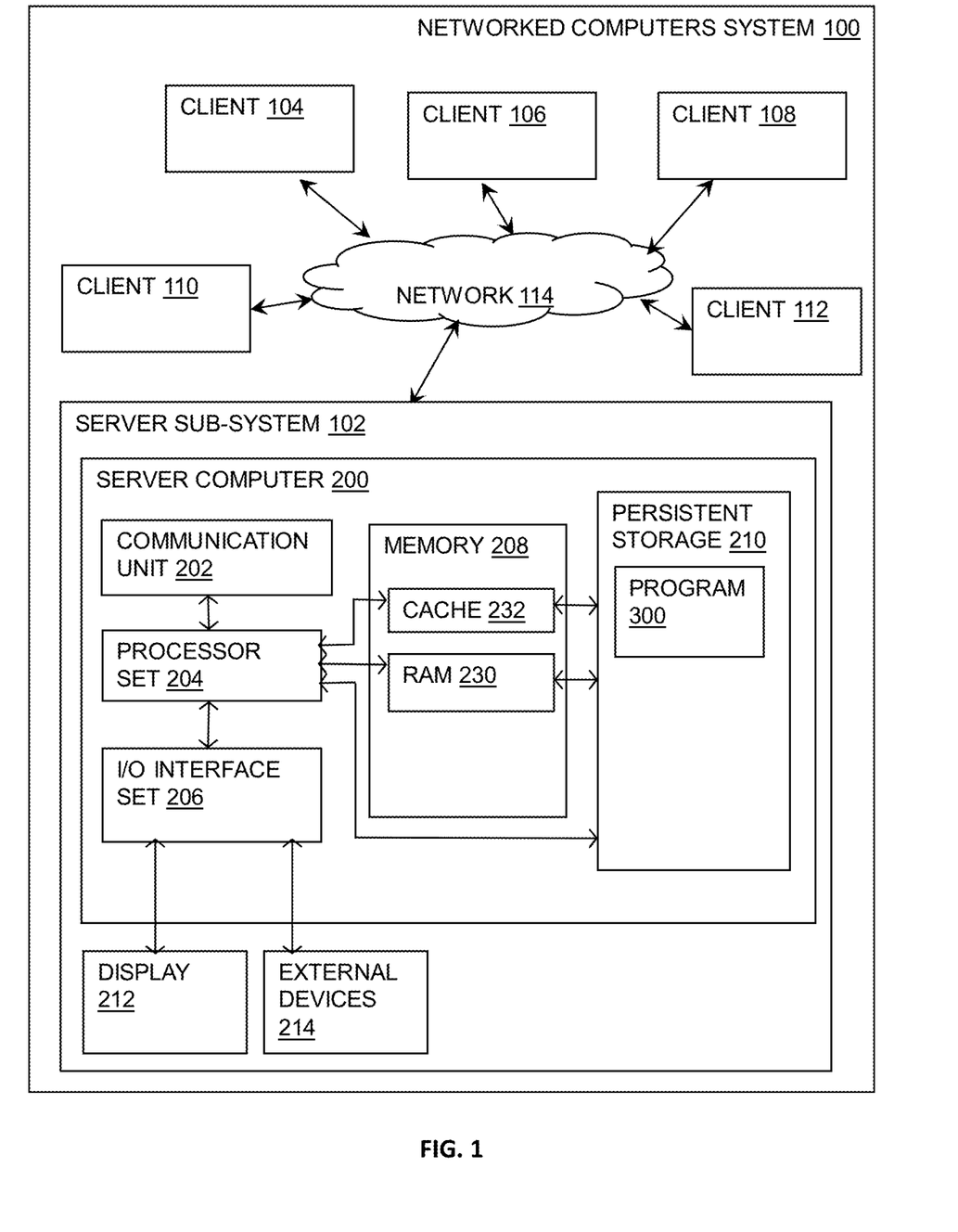
FIG. 1 is a block diagram view of a first embodiment of a system, according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, and 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can comprise generating and/or recommending 3D printable images, training machine language framework(s) (e.g., GANs, etc.) to generate new images, translating 2D images into 3D models, 3D printing of objects, and/or the like. In some embodiments, one or more databases (not shown) may be associated with and/or accessed by sub-system 102 and/or the like. Such database(s) can include images (e.g., 2D images, etc.) that can be used in the creation of new and/or compelling 3D printable images (e.g., using AI such as GAN, etc.).

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
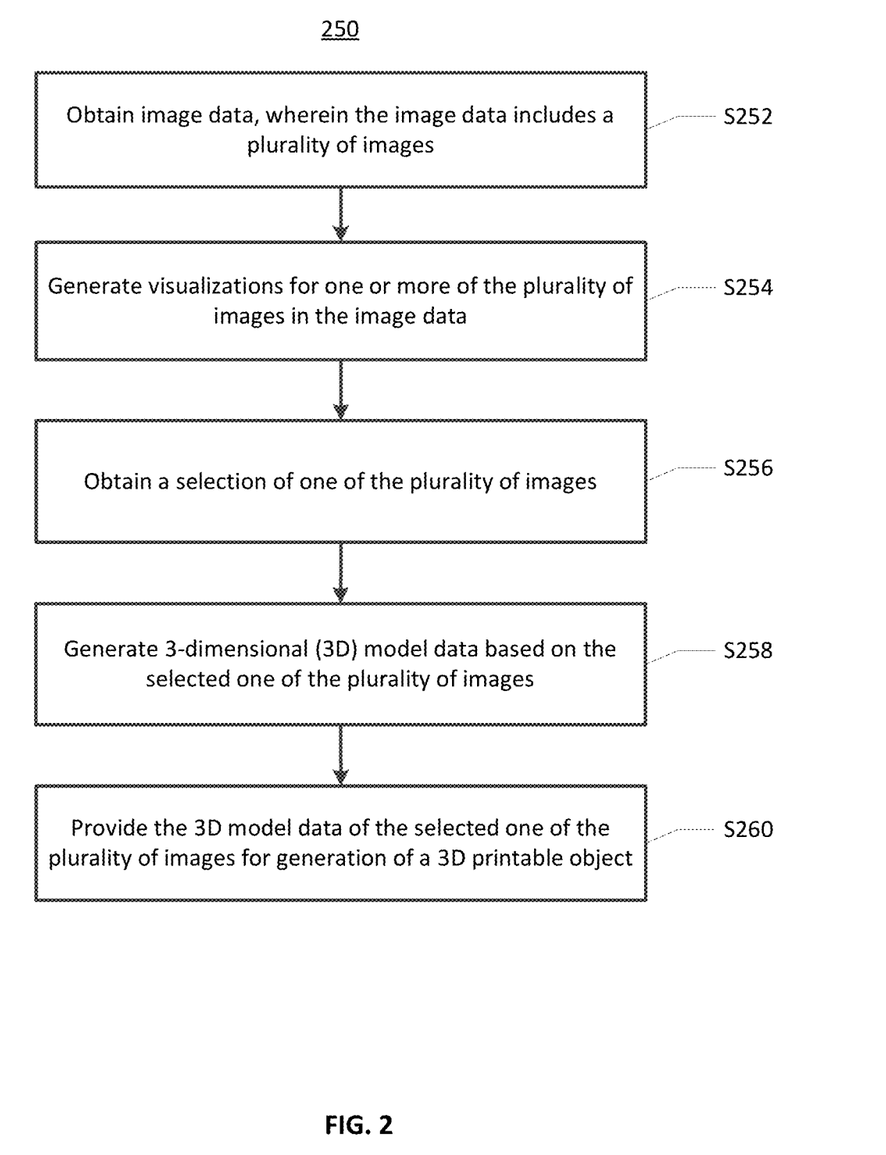
FIG. 2 is a flowchart showing a first embodiment method performed, at least in part, by the first embodiment system.
Figure 3:
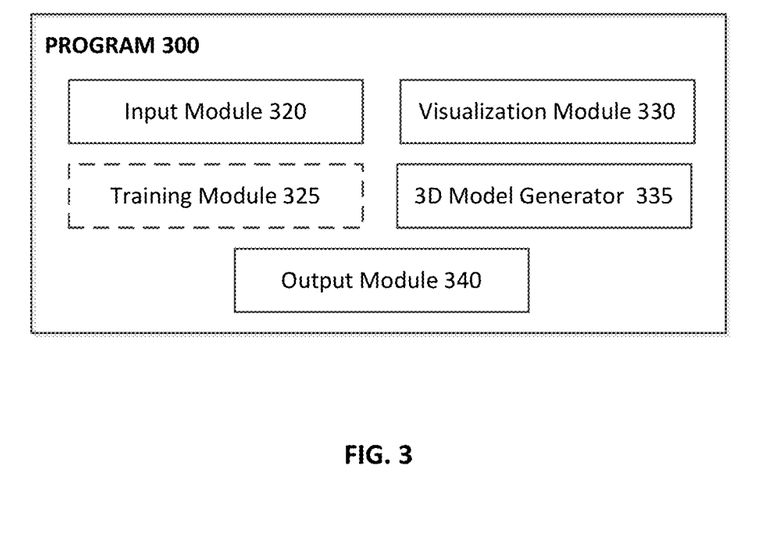
FIG. 3 is a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for provisioning of 3D printable images begin at operation S252, where a computing system (e.g., server computer 200 of FIG. 1 or the like) obtain image data. The image data can include a plurality of images (e.g., 3D printable images, etc.). As an example, an input module 320 of FIG. 3 and/or the like can obtain image data that may can be used for recommending and visualizing 3D printable images.

In some embodiments, for example, a machine learning framework (e.g., AI algorithms, GAN, etc.) can be trained to generate new images based on existing images (e.g., stored in one or more databases) and/or the like. For example, a GAN/AI can identify various classes of images and create new designs/images for one or more image classes. As an example, a training module 325 and/or the like can provide for elaborating various classes of images (e.g., previously created images, based on industries/applications, etc.) and using previously created images to train AI algorithms, GAN, and/or the like, for the generation of new images/designs, for example, duplicating images in each class of images with new, synthetic images/designs. One or more databases of such new images/designs can be associated with or accessed by the computing system to obtain image data for use in recommending and visualizing 3D printable images.

Processing proceeds to operation S254, where the computing system (e.g., server computer 200 of FIG. 1 or the like) visualizations for one or more of a plurality of images included in the image data. In some embodiments, the computing system can include a mixed reality environment which can allow for providing visualizations of one or more images and provide for user interaction with the mixed reality environment, images, 3D printers, and or the like, for example using augmented reality (AR) devices such as AR glasses. As an example, a visualization module 330 and/or the like can allow for starting a mixed reality environment/virtual reality environment, generating visualizations of images in a mixed reality environment, virtual reality environment, interaction with the image(s) and/or mixed reality/virtual reality environment, and/or the like. In some embodiments, the visualization module 330, mixed reality environment, and/or the like can provide for an AR input/output device (e.g., AR glasses, etc.) to guide a user through interactions with image visualization, image selection, 3D printing, and/or the like. In some embodiments, the visualization(s), for example, in a mixed reality environment, can provide for improved visualization and/or understanding of pose(s), necessary alignment(s) (e.g., depth(s), dimension(s), length(s), height(s), diameter(s), etc.). In some embodiments, the visualization(s) can provide for improved comprehension of the spatial representation of a proposed object (e.g., based on a 3D printable image, etc.) in a physical environment. In some embodiments, the visualization(s) can provide for 360-degree viewing of a 3D printable image, for example, allowing a user to visualize dimensions, hollowness, and/or the like. In some embodiments, the computing system can provide for generating recommendations for optimal printing processes/objects as part of the image visualization in a mixed reality environment.

Processing proceeds to operation S256, where the computing system (e.g., server computer 200 of FIG. 1 or the like) obtains a selection of an image (e.g., one of a plurality of recommended/visualized images, etc.). As an example, an input module 320 and/or the like can allow for obtaining a selection of a visualized 3D printable image that is to be printed, such as by receiving selection input data from a user and/or the like. For example, the computing system can provide for selection of a desired image/design (e.g., appealing design, etc.) from among a plurality of recommended images/designs.

Processing proceeds to operation S258, where the computing system (e.g., server computer 200 of FIG. 1 or the like) generates 3D model data based on the selected image (e.g., the selected image from the recommended/visualized images, etc.). As an example, a 3D model generator module 335 and/or the like can receive selected image data, for example, from a mixed reality environment, and can process the image data to generate a 3D model to allow for printing of the selected image on a 3D printer. For example, in some embodiments, the computing system can provide for performing 3D model generation, surface encoding, reconstruction, and/or the like. In some embodiments, the computing system can provide for 3D model generation using a 3D printing language (e.g., geometry code (G-code), etc.) simulator. In some embodiments, as part of the visualization of images, generation of 3D models based on visualized images, and/or the like, the computing system can provide for generating recommendations for optimal printing of objects, for example, in terms of materials, dimensions, efficiency, performance, and/or the like. In some embodiments, the generated model can provide a new image/design having optimal trade-offs between design, cost, printing time, and/or the like.

Processing proceeds to operation S260, where the computing system (e.g., server computer 200 of FIG. 1 or the like) can provide the 3D model data to one or more 3D printers to generate (e.g., print) a physical 3D object. As an example, an output module 340 and/or the like can provide the data associated with/representative of a 3D model to one or more 3D printers.

Further Comments and/or Embodiments

Figure 4:
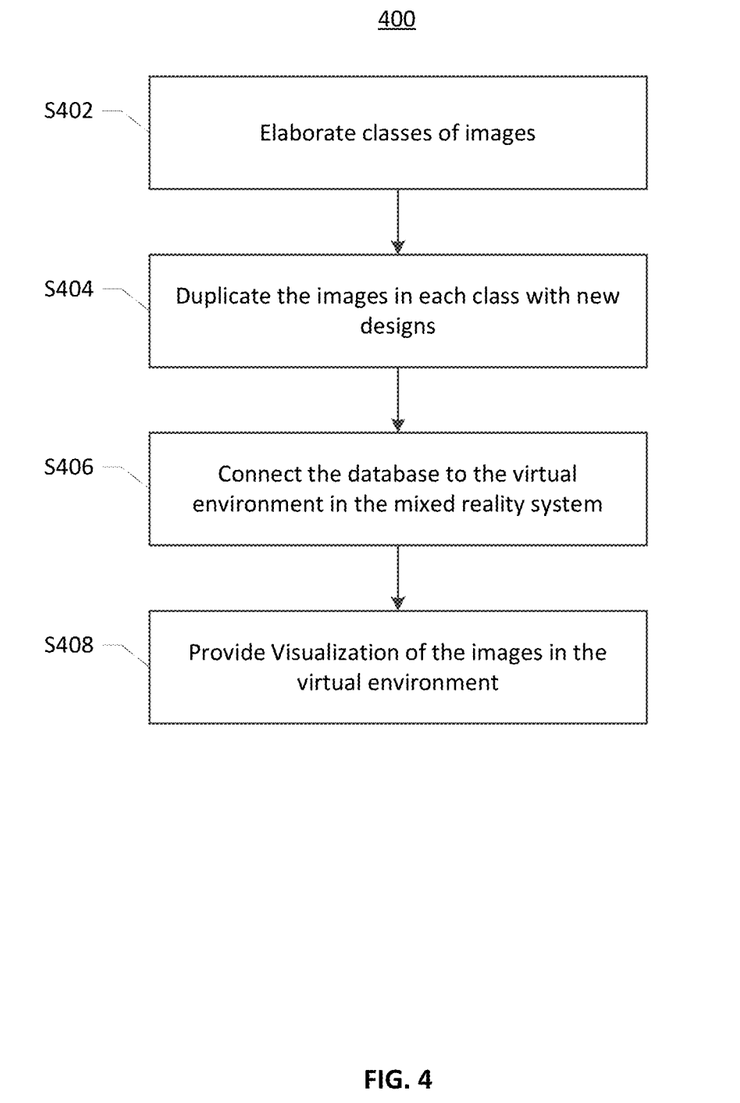
FIG. 4 is a flowchart showing an example embodiment method for generating/visualizing new images, according to embodiments of the present invention.

FIG. 4 provides a flowchart 400 illustrating an example embodiment method for generating/visualizing new images, according to embodiments of the present invention. As illustrated in FIG. 4, in some embodiments, operations for generating/visualizing new images (e.g., 3D printable images) begin at operation S402, where a computing system (e.g., server computer 200 of FIG. 1 or the like) may determine/elaborate one or more classes of images. For example, in some embodiments, the computing system may be associated with and/or access one or more databases of previously created images. In some embodiments, the computing system may determine/elaborate the classes associated with the previously created images stored in the database(s). In some embodiments, the computing system may determine/elaborate various classes of images (e.g., for which new images/designs are to be generated) based on data associated one or more industries and/or applications.

Processing proceeds to operation S404, where the computing system (e.g., server computer 200 of FIG. 1 or the like) may duplicate the images in each class with new images/designs. For example, in some embodiments, the computing system can use the images (e.g., from the elaborated classes of images, etc.) to train a machine language framework such as AI algorithms, GAN, and/or the like, for the generation of new images/designs, for example, duplicating images in each class of images with new images/designs. GANs can provide algorithmic architectures that use two or more neural networks (e.g., generator and discriminator, etc.) where one network can compete against another network to generate new, synthetic instances of images. The generated images/designs can be stored in one or more databases and, for example, be provided to a computing system for use in provisioning of 3D printable images.

Processing proceeds to operation S406, where the computing system (e.g., server computer 200 of FIG. 1 or the like) may connect one or more databases of new images/designs to a virtual environment, mixed reality environment, and/or the like and provide one or more images (e.g., image data), for example, for image recommendation and/or visualization as part of automatic provisioning of 3D images for printing. Processing proceeds to operation S408, where the computing system (e.g., server computer 200 of FIG. 1 or the like) may provide for generating visualizations of one or more images (e.g., from the database(s), etc.) within the virtual environment, mixed reality environment, and/or the like. The computing system can provide the visualizations such that one or more images (e.g., desired image, appropriate image, adequate image, optimal image, etc.) may be selected for printing using a 3D printer.

Figure 5:
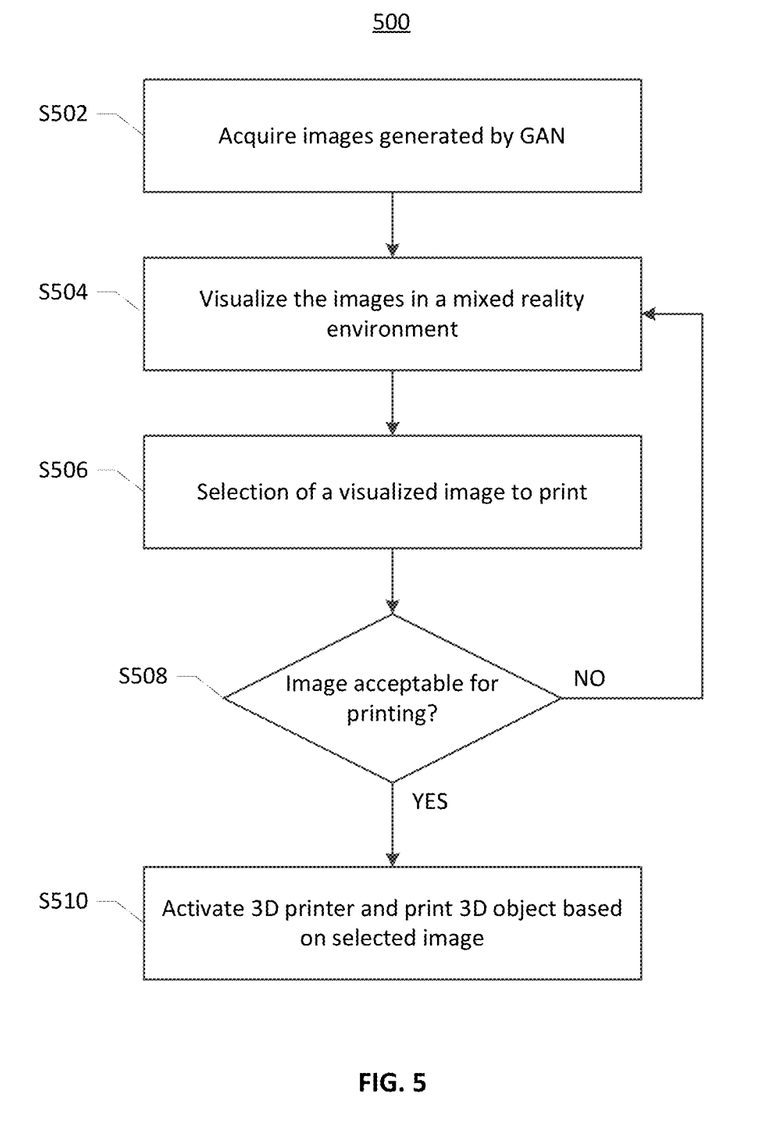
FIG. 5 is a flowchart showing an example embodiment method for provisioning of 3D printable images, according to embodiments of the present invention.

FIG. 5 provides a flowchart 500 illustrating an example embodiment method for provisioning of 3D printable images, according to embodiments of the present invention. As illustrated in FIG. 5, in some embodiments, operations for provisioning of 3D images for printing begin at operation S502, where a computing system (e.g., server computer 200 of FIG. 1 or the like) may provide for acquiring one or more images, for example, generated by one or more AI algorithms, GANs, and/or the like. GANs can provide algorithmic architectures that use two or more neural networks (e.g., generator and discriminator, etc.) where one network can compete against another network to generate new, synthetic instances of existing images.

Processing proceeds to operation S504, where the computing system (e.g., server computer 200 of FIG. 1 or the like) may provide for visualizing the acquired images, for example, using a mixed reality environment (e.g., virtual reality, augmented reality, etc.). Processing proceeds to operation S506, where the computing system (e.g., server computer 200 of FIG. 1 or the like) may provide for obtaining a selection of an image (e.g., from the visualize images, etc.) to be printed using a 3D printer. In some embodiments, the selected image(s) may be translated into 3D printable image(s), for example, using G-code, 3D model surface encoding, 3D model reconstruction, and/or the like.

Processing proceeds to operation S508, where the computing system (e.g., server computer 200 of FIG. 1 or the like) may determine whether the image is acceptable for printing. If it is determined that the image is acceptable for printing (S508-YES), processing proceeds to operation S510, where the computing system (e.g., server computer 200 of FIG. 1 or the like) may activate one or more 3D printers and print a physical object, for example, based on a 3D model of the selected image. If the image is not acceptable for printing (S508-NO), processing returns to operation S504.

Figure 6:
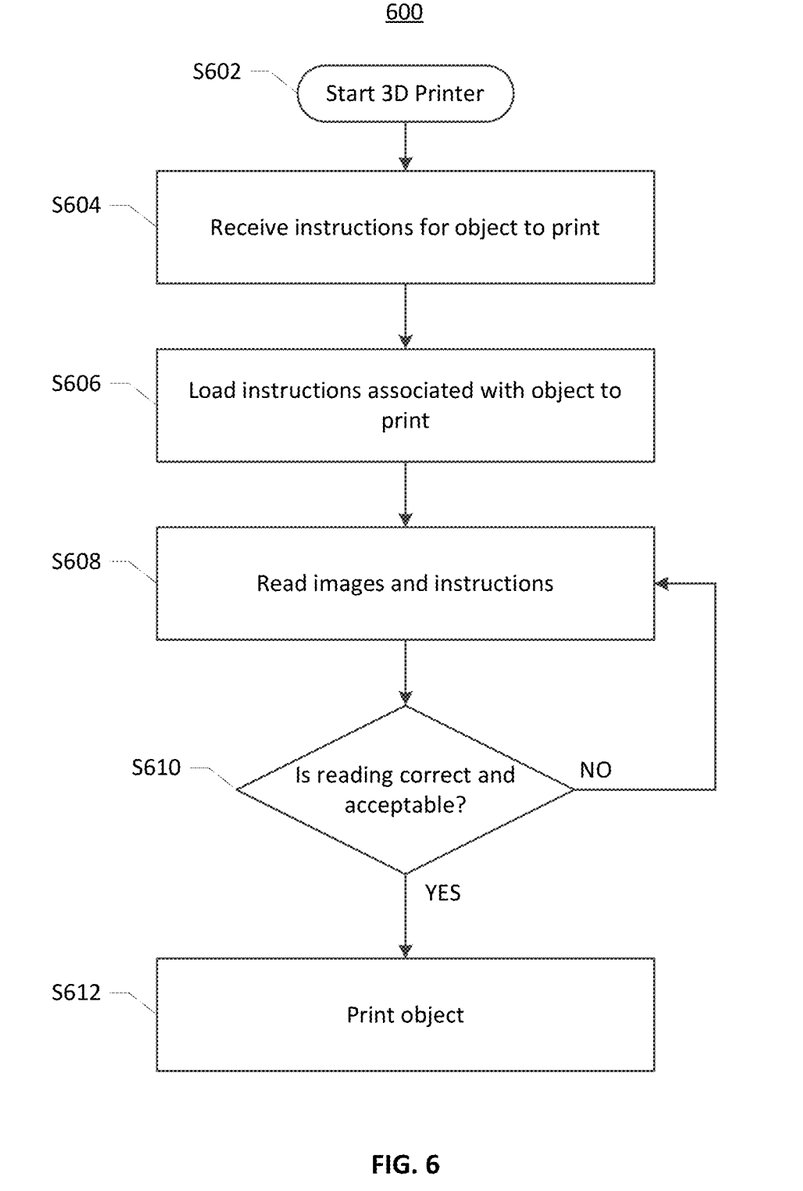
FIG. 6 is a flowchart showing an example embodiment method for printing 3D printable images, according to embodiments of the present invention.

FIG. 6 provides a flowchart 600 illustrating an example embodiment method for printing 3D images, according to embodiments of the present invention. As illustrated in FIG. 6, in some embodiments, operations for printing of 3D images begin at operation S602, where a computing system (e.g., server computer 200 of FIG. 1 or the like) may start a 3D printer.

Processing proceeds to operation S604, where the computing system (e.g., server computer 200 of FIG. 1 or the like), 3D printer, and/or the like may receive instructions (e.g., from a mixed reality system/environment, etc.) for an object (e.g., product, etc.) to be printed.

Processing proceeds to operation S606, where the computing system (e.g., server computer 200 of FIG. 1 or the like), 3D printer, and/or the like may load the instructions associated with the object (e.g., product, etc.) to be printed.

Processing proceeds to operation S608, where the computing system (e.g., server computer 200 of FIG. 1 or the like), 3D printer, and/or the like may read the image(s) and instructions associated with the object (e.g., product, etc.) to be printed.

Processing proceeds to operation S610, where the computing system (e.g., server computer 200 of FIG. 1 or the like), 3D printer, and/or the like may determine whether reading of the instructions and image(s) are correct and acceptable for printing. If the reading is determined to be correct and acceptable (S610-YES), processing proceeds to operation S612 where the 3D printer may print the object (e.g., product). If the reading is not correct and acceptable (S610-YES), processing returns to S608.

Figure 7:
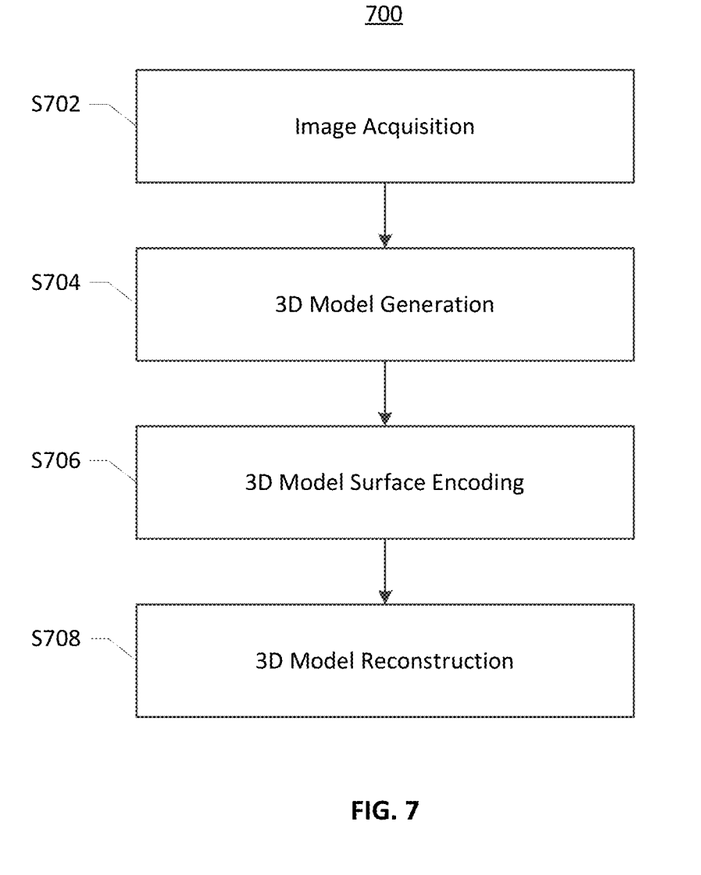
FIG. 7 is a flowchart showing an example embodiment method for 3D model generation, according to embodiments of the present invention.

FIG. 7 provides a flowchart 700 illustrating an example embodiment method for 3D model generation, according to embodiments of the present invention. As illustrated in FIG. 7, in some embodiments, operations for 3D model generation begin at operation S702, where a computing system (e.g., G-code simulator included in server computer 200 of FIG. 1 and/or the like) may acquire image data associated with a selected image. For example, image data may be acquired based on an obtained selection of one or more images from a plurality of recommended/visualized images. The image selection may be obtained via a mixed reality system/environment which provides for visualization and interaction with one or more images (e.g., generated by a GAN, etc.).

Processing proceeds to operation S704, where the computing system may start 3D model generation, for example, converting a processed image into a 3D file format. A 3D file format can be used to store information associated with 3D models. For example, a 3D file format such as a geometry definition file format (OBJ file format) can be used to store estimates of the geometry of a 3D model from a processed image.

Processing proceeds to operation S706, where the computing system may generate 3D model surface encoding data based, at least in part, on the acquired image data (e.g., associated with the selected image(s)). For example, 3D model surface encoding data can be generated by converting a processed image into a binary image. The area of pixels of a previous layer in an image can be assigned one color (e.g., black, etc.) and a current layer in the image can be assigned another color (e.g., gray, etc.). The pixel values of an image can be used as depth values in converting a 2D processed image into a 3D image.

Processing proceeds to operation S708, where the computing system may generate 3D model reconstruction data based, at least in part, on the acquired image data (e.g., associated with the selected image(s)). For example, 3D model reconstruction data may be generated as part of converting the processed image into a 3D file format. The 3D model generated based on the selected image may then be used to generate an object (e.g., product) through 3D printing.

In some embodiments, the systems and methods of the present disclosure can provide efficient interaction mechanisms (e.g., between an operator/designer and a 3D printer) allowing improved flexibility and use of additive manufacturing potential. As an example, the use of machine learning framework such as GAN and/or the like can provide more efficiency in generating images as opposed to manually creating models, for example, using CAD.

According to aspects of the present disclosure, in some embodiments, combining generative adversarial networks (GANs) with mixed reality systems/environments can provide for improvements in the visualization and understanding of 3D printing aspects such as the pose, the necessary alignment (e.g., depths, dimensions, length, height, diameters, etc.) and/or the like.

In some embodiments, systems and methods of the present disclosure can provide for improved comprehensions of the spatial representation of an object in a physical environment and provide for 360-degree viewing to visualize aspects such as dimensions, hollowness, and/or the like.

In some embodiments, systems and methods of the present disclosure can provide for improved analysis of the synergies between GAN designs and the optimization of the materials, structures, and/or the like (e.g., less waste, less labour costs, less scrap, etc.). Systems and methods of the present disclosure can provide for using GAN/AI to design high performing and cost-efficient products that can be produced for markets more quickly while consuming less resources.

According to other aspects of the present disclosure, in some embodiments, the use of GAN/AI and mixed reality systems/environments can allow for and/or improve collaboration across geographies and provide real-time information sharing, providing improvements in use of 3D printers. In some embodiments, the use of GAN/AI and mixed reality systems/environments GAN/AI can allow for developing designs that may be difficult for human designers/operators to contemplate but that may be compelling and performable, while consuming less resources.

Some embodiments of the present disclosure can allow for the rapid and efficient generation of a catalogue of images using more intelligent design which may increase the exploitation of 3D printers while reducing utilization time of 3D printers required to print an object.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   obtaining image data, wherein the image data includes a plurality of images;
   generating visualizations for one or more of the plurality of images included in the image data;
   enabling a user to interact with the generated visualizations to provide one or more adjusted visualizations;
   obtaining a selection of the one or more adjusted visualizations;
   generating 3-dimensional (3D) model data based on the selected one or more adjusted visualizations; and
   providing the 3D model data of the selected one or more adjusted visualizations for generation of a 3D printable object.

2. The computer-implemented method of claim 1, further comprising:
   determining one or more classes of images;
   generating one or more new images in each of the one or more classes using a machine learning framework, wherein the machine learning framework is trained to generate new images for the one or more classes of images; and
   providing the one or more new images as part of the image data.

3. The computer-implemented method of claim 2, wherein the machine learning framework includes a generative adversarial network.

4. The computer-implemented method of claim 1, wherein the visualizations of each of the plurality of images are generated within a virtual environment based on mixed reality.

5. The computer-implemented method of claim 4, further comprising providing image visualization output to an augmented reality device as part of the generating of visualizations of each of the plurality of images within the virtual environment.

6. The computer-implemented method of claim 1, wherein the generating of 3D model data based on the selected one or more adjusted visualizations comprises:
   acquiring image data associated with the selected one of the plurality of images;
   generating 3D model surface encoding data based, at least in part, on the image data associated with the selected one of the plurality of images; and
   generating 3D model reconstruction data based, at least in part, on the image data associated with the selected one of the plurality of images.

7. The computer-implemented method of claim 1, wherein the 3D model data is stored using a 3D file format.

8. The computer-implemented method of claim 1, further comprising generating recommendations for optimal printing of the 3D printable object.

9. A computer program product comprising a computer readable storage medium having stored thereon:
   program instructions programmed to obtain image data, wherein the image data includes a plurality of images;
   program instructions programmed to generate visualizations for one or more of the plurality of images included in the image data;
   program instructions programmed to enable a user to interact with the generated visualizations to provide one or more adjusted visualizations;
   program instructions programmed to obtain a selection of the one or more adjusted visualizations;
   program instructions programmed to generate three-dimensional (3D) model data based on the selected one or more adjusted visualizations; and
   program instructions programmed to provide the 3D model data of the selected one or more adjusted visualizations for generation of a 3D printable object.

10. The computer program product of claim 9, the computer readable storage medium having further stored thereon:
    program instructions programmed to determine one or more classes of images;
    program instructions programmed to generate one or more new images in each of the one or more classes using a machine learning framework, wherein the machine learning framework is trained to generate new images for the one or more classes of images; and
    program instructions programmed to provide the one or more new images as part of the image data.

11. The computer program product of claim 10, wherein the machine learning framework includes a generative adversarial network.

12. The computer program product of claim 9, wherein the visualizations of each of the plurality of images are generated within a virtual environment based on mixed reality.

13. The computer program product of claim 12, the computer readable storage medium having further stored thereon:
    program instructions programmed to provide image visualization output to an augmented reality device as part of the generating of visualizations of each of the plurality of images within the virtual environment.

14. The computer program product of claim 9, the computer readable storage medium having further stored thereon:
    program instructions programmed to acquire image data associated with the selected one or more adjusted visualizations;
    program instructions programmed to generate 3D model surface encoding data based, at least in part, on the image data associated with the selected one of the plurality of images; and
    program instructions programmed to generate 3D model reconstruction data based, at least in part, on the image data associated with the selected one of the plurality of images.

15. The computer program product of claim 9, wherein the 3D model data is stored using a 3D file format.

16. The computer program product of claim 9, the computer readable storage medium having further stored thereon:

program instructions programmed to generate recommendations for optimal printing of the 3D printable object.

17. A computer system comprising:
a processor set; and
a computer readable storage medium;
wherein:
- the processor set is structured, located, connected and programmed to run program instructions stored on the computer readable storage medium; and
- the stored program instructions include:
  - program instructions programmed to obtain image data, wherein the image data includes a plurality of images;
  - program instructions programmed to generate visualizations for one or more of the plurality of images included in the image data;
  - program instructions programmed to enable a user to interact with the generated visualizations to provide one or more adjusted visualizations;
  - program instructions programmed to obtain a selection of one or more adjusted visualizations;
  - program instructions programmed to generate three-dimensional (3D) model data based on the selected one or more adjusted visualizations; and
  - program instructions programmed to provide the 3D model data of the selected one or more adjusted visualizations for generation of a 3D printable object.

18. The computer system of claim 17, wherein the stored program instructions further include:
- program instructions programmed to determine one or more classes of images;
- program instructions programmed to generate one or more new images in each of the one or more classes using a machine learning framework, wherein the machine learning framework is trained to generate new images for the one or more classes of images; and
- program instructions programmed to provide the one or more new images as part of the image data.

19. The computer system of claim 18, wherein the machine learning framework includes a generative adversarial network.

20. The computer system of claim 17, wherein the visualizations of each of the plurality of images are generated within a virtual environment based on mixed reality.

* * * * *